(No Model.)
H. THOMPSON.
CAR BRAKE.
No. 512,588. Patented Jan. 9, 1894.
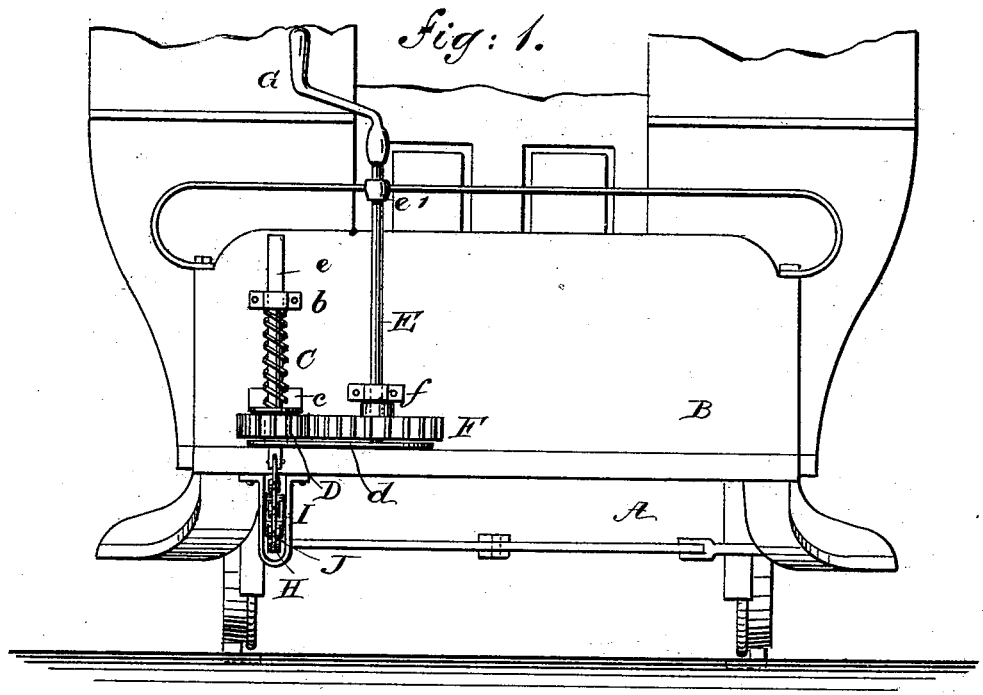
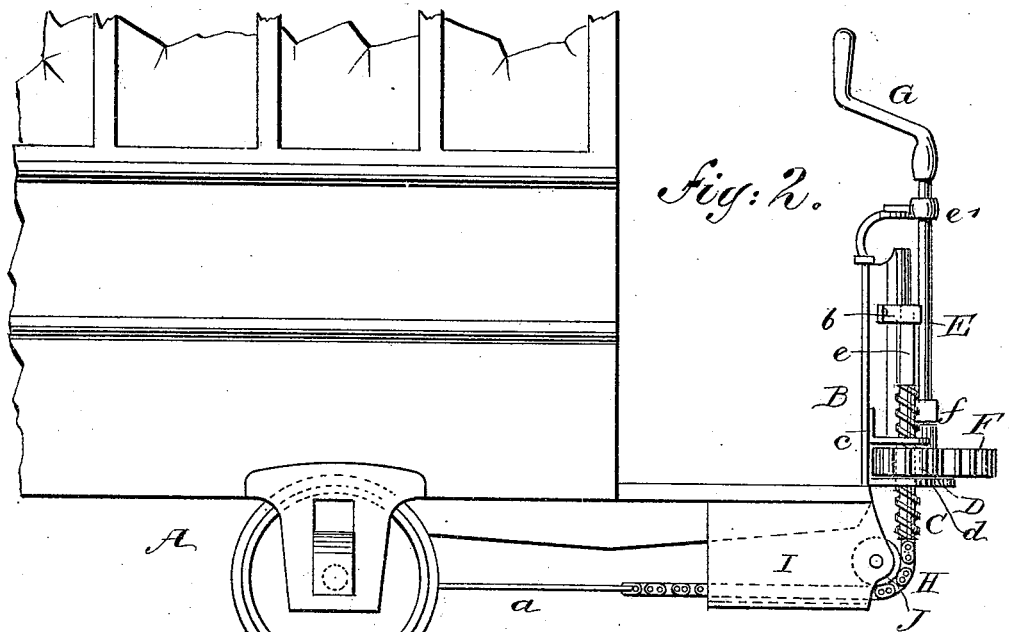
WITNESSES:
Chas. Nida.
C. Sedgwick
INVENTOR
H. Thompson
BY Munn & Co.
ATTORNEYS.

UNITED STATES PATENT OFFICE.

HARRY THOMPSON, OF BROOKLYN, ASSIGNOR TO HIMSELF, AND JOHN F. AMBROSE, OF NEW YORK, N. Y.

CAR-BRAKE.

SPECIFICATION forming part of Letters Patent No. 512,588, dated January 9, 1894.

Application filed October 24, 1893. Serial No. 488,976. (No model.)

*To all whom it may concern:*

Be it known that I, HARRY THOMPSON, of Brooklyn, in the county of Kings and State of New York, have invented a new and Improved Car-Brake, of which the following is a specification, reference being had to the annexed drawings, forming a part thereof, in which—

Figure 1 is a partial end elevation of a car to which my improved brake has been applied; and Fig. 2 is a partial side elevation.

Similar letters of reference indicate corresponding parts in both views.

The object of my invention is to provide a simple, effective and quick acting car brake, which will hold the pressure on the wheels without the use of pawl and ratchet mechanism.

My invention consists of a screw-threaded rod placed in guides at the end of a car so that it may slide without turning, an internally threaded pinion placed on the screw and arranged to turn thereon, but prevented from sliding, a spur wheel mounted on a shaft and adapted to engage the pinion, a brake handle or crank applied to the upper end of the spur wheel shaft, and a chain connecting the sliding screw with the brake levers carried by the car, all as will be hereinafter more fully described.

The car A, which is of a well known pattern, is provided with the ordinary brake shoe, brake beam and brake-operating levers, also with the brake rod $a$.

To the dash-board B at the end of the car are secured brackets $b$, $c$, $d$, which guide the screw C. The screw C is provided with a square shank $e$, which fits a square hole in the bracket $b$, and on the screw, between the brackets $c$, $d$, is placed an internally threaded pinion D. The thread of the screw is preferably double or treble, to secure a quick pitch, so that by turning the pinion D, the screw will move quickly in either direction, while the pitch is sufficient to insure the amount of friction between the screw and nut necessary to prevent the screw from turning the internally threaded pinion D.

A shaft E, journaled in brackets $e'$, $f$, also in the bracket $d$, carries a spur wheel F, which engages the pinion D. The upper end of the shaft E projects beyond the top of the dashboard, and is provided with a hand crank G, by which the said shaft may be turned. The lower end of the screw C is slotted to receive one end of a chain H, the other end of the chain being attached to the brake-rod $a$. In a U-shaped support I, attached to the bottom of the car platform is journaled a sheave J, which changes the direction of the chain H from the vertical to the horizontal.

To apply my improved brake it is only necessary to turn the shaft E in one direction, when the spur wheel F will turn the pinion D, thus causing the internal threads of the pinion to engage and force upwardly the screw C, thereby putting the chain H and brake rod $a$ under tension, and applying the brakes with more or less pressure according to the amount of power applied to the crank G, and when applied, the brakes are held by the screw C independently of the crank G and shaft E. When it is desired to release the brakes, the crank is turned in the opposite direction.

It is obvious that with my improvement a motorman on an electric car, or a gripman on a cable car, can apply the brakes and leave them applied, while he can give his attention to operating the switch or the grip, as the case may be.

By means of my improved brake-operating mechanism, many of the accidents now common upon street car lines will be obviated, as my improved mechanism leaves the motorman or gripman free to use both hands for operating the car moving devices.

Having thus described my invention, I claim as new and desire to secure by Letters Patent—

1. The combination, with the brake levers and brakes of a car, of a screw of quick pitch capable of being slid without turning, an internally threaded pinion arranged to turn on the screw but prevented from sliding thereon, a spur wheel and a crank shaft for operating the internally threaded pinion, and the brake connections, substantially as specified.

2. The combination, of the multiple threaded screw C provided with the square shank e, the brackets b, c, d adapted to receive and guide the screw, the internally threaded pinion D placed between the brackets c, d and capable of turning on the screw, the spur wheel F engaging the pinion D, the shaft E carrying the spur wheel F, and means for connecting the screw C with the brake rod, substantially as specified.

HARRY THOMPSON.

Witnesses:
E. M. CLARK,
C. SEDGWICK.